May 31, 1955 P. O. WALTER 2,709,315
FISHING POLE
Filed Aug. 17, 1954 2 Sheets-Sheet 1
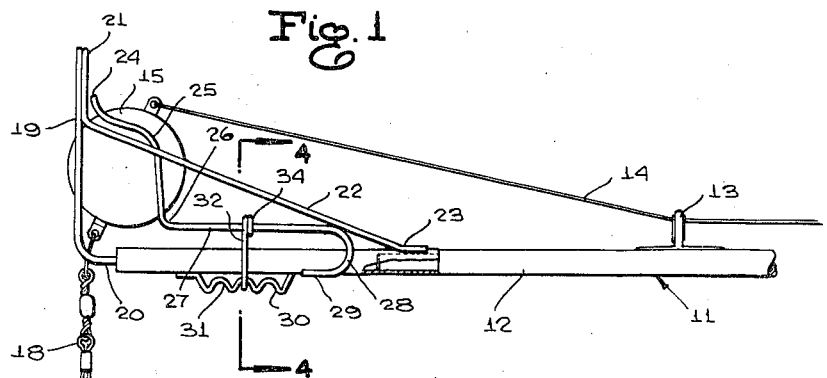
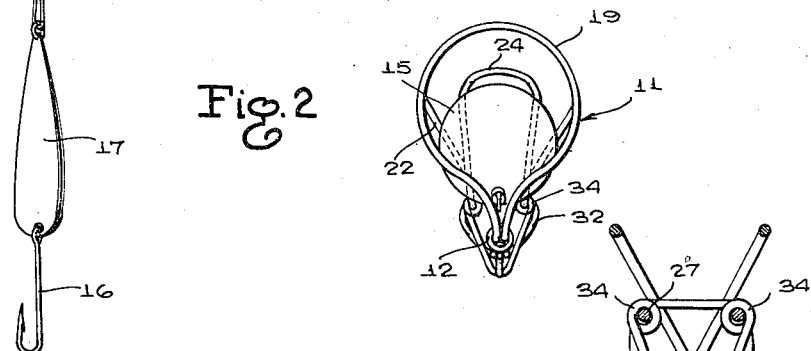
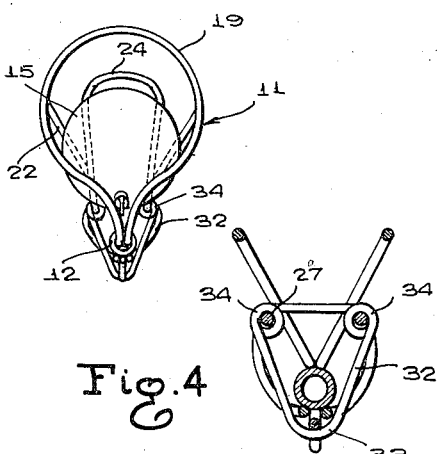
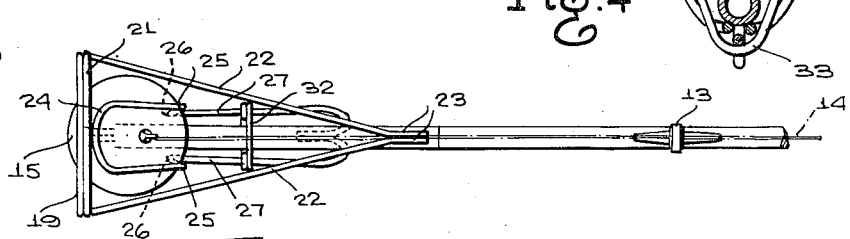
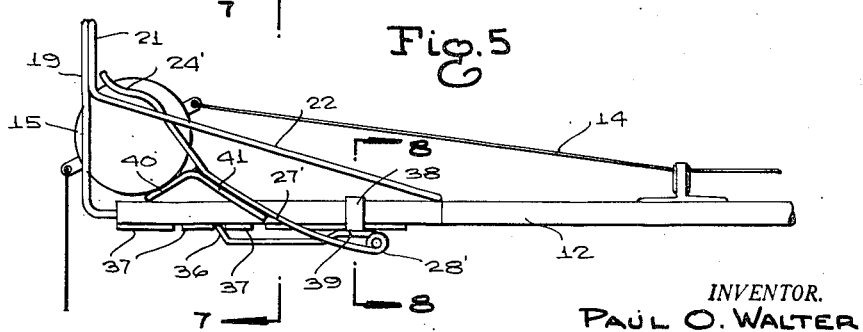
INVENTOR.
PAUL O. WALTER
BY
McMorrow, Berman & Davidson
ATTORNEYS

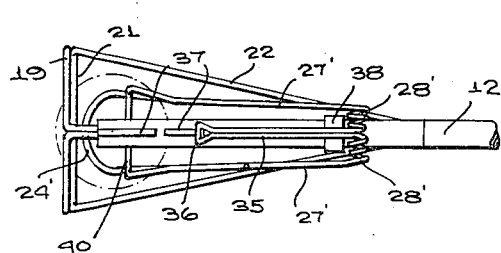
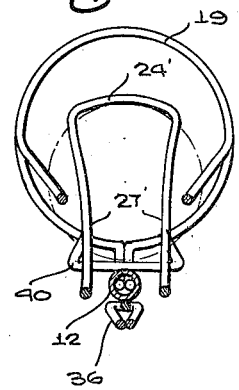
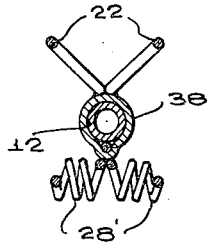
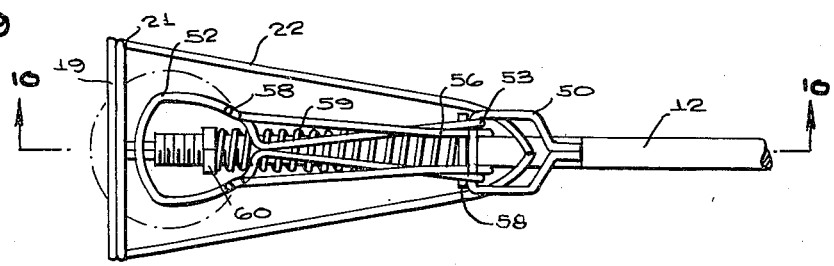
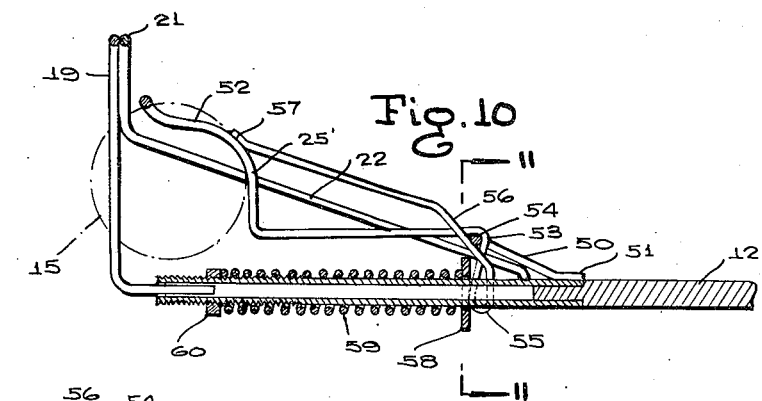
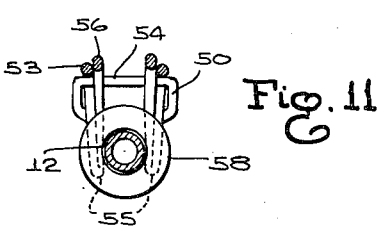

United States Patent Office 2,709,315
Patented May 31, 1955

2,709,315

FISHING POLE

Paul O. Walter, Billings, Mont.

Application August 17, 1954, Serial No. 450,420

3 Claims. (Cl. 43—24)

This invention relates to fishermen's equipment, and more particularly to an improved fishing pole for use in casting.

The main object of the invention is to provide a novel and improved casting pole which is simple in construction, which is arranged so that the fishing line associated therewith need not be manually held when making a cast, and being arranged so that the fishing pole may be automatically set for casting when the fishing line associated therewith is reeled in.

A further object of the invention is to provide an improved fishing pole especially suitable for casting, said fishing pole involving inexpensive components, being durable in construction, and being arranged so that the line and hook associated therewith are automatically released when making a cast, the pole being provided with improved means for adjusting the amount of casting force required to release the fishing line.

Further objects and advantages of the invention will become apparent from the following description and claims, and from the accompanying drawings, wherein:

Figure 1 is a side elevational view, partly in cross section, of the end portion of an improved fishing pole constructed in accordance with the present invention.

Figure 2 is an end view of the fishing pole of Figure 1.

Figure 3 is a top plan view of the portion of the fishing pole shown in Figure 1.

Figure 4 is an enlarged transverse vertical cross sectional view taken on the line 4—4 of Figure 1.

Figure 5 is a fragmentary side elevational view of a modified form of fishing pole according to the present invention.

Figure 6 is a bottom plan view of the end portion of the modified fishing pole of Figure 5.

Figure 7 is an enlarged transverse vertical cross sectional view taken on the line 7—7 of Figure 5.

Figure 8 is an enlarged transverse vertical cross sectional view taken on the line 8—8 of Figure 5.

Figure 9 is a top plan view of the end portion of a further modified form of fishing pole according to the present invention.

Figure 10 is a vertical cross sectional view taken on the line 10—10 of Figure 9.

Figure 11 is a transverse enlarged vertical cross sectional view taken on the line 11—11 of Figure 10.

Referring to the drawings, and more particularly to Figures 1 to 4, 11 designates a fishing pole constructed according to the present invention, said pole comprising the elongated rod 12, which may be of hollow tubular construction, and which may be provided with a plurality of apertured guide members 13 through which the fishing line 14 is slidably engaged, the line being connected to a conventional reel, not shown, mounted adjacent the handle of the pole. Connected to the end of the line 14 is the ball float 15, and connected to the float is the fishing hook 16, the hook being connected to the float through a sinker 17 and conventional swivel connectors 18, as shown in Figure 1.

Designated at 19 is a substantially rigid loop member of relatively stiff wire stock or the like which is bent into a substantially pear-shaped configuration having the rightangled end portions 20 which are housed in and which are secured in the end of the rod 12. Thus, the main portion of the loop 19 extends perpendicular to the rod 12. Secured to the upper portion of the loop 19 is an arcuate reinforcing member 21 having the strut-like arms 22, 22 which converge downwardly and inwardly and are secured at 23, 23 to the rod 12. Designated at 24 is a generally U-shaped spring arm having the bowed portions 25, 25 facing the loop 19 and having the bends 26, 26 in its respective side arm portions, whereby the rear portions 27 of the side arms of the U-shaped member 24 extend substantially parallel to the rod 12. Said rear portions are curved downwardly and beneath the rod 12, as shown at 28, and are rigidly secured to the under surface of the rod at 29. Secured to the under surface of the rod is the sinuously bent detent member 30 defining a plurality of locking loops 31 spaced longitudinally along the rod, as is clearly shown in Figure 1.

Designated at 32 is a generally triangular locking ring having a bottom loop 33 which is lockingly engageable in a selected detent loop 31 and which has the upper corner coils 34, 34 slidably engaged with the respective straight rear arm portions 27 of the U-shaped spring member 24, as shown in Figures 1 and 4. It will be apparent from Figure 1 that by adjusting the triangular ring member 32 longitudinally, the normal tension of the U-shaped spring arm 24 may be adjusted to a desired amount. It will be further apparent that the coil elements 24 define fulcrum portions which are adjustable along the straight arm portions 27 to adjust the effective fulcrum points of arms 27 with respect to the flexible U-shaped member 24.

When the fishing line 14 is reeled in, the ball member 15 will be passed through the loops 19 and will be engaged by the U-shaped spring arm 24, said spring arm releasably clamping the ball member against the lower portion of the loop 19, as shown in Figure 1. The degree of clamping pressure may be regulated by adjusting the position of the ring member 32, as above described. When a cast is made, the inertia of the float ball 15 overcomes the clamping force holding the float against the lower portion of the loop 19, causing the float to be released and to pass out of the loop 19, allowing the desired cast to be made. To reset the pole for the next cast, the line 14 is merely reeled in, causing the float 15 to be engaged against the lower portion of the loop 19 and to be clampingly held in this position by the U-shaped spring arm 24.

In the form of the invention shown in Figures 5 to 8, the U-shaped spring arm, shown at 24', has the side arms 27' which are formed with the respective transversely aligned coiled portions 28' terminating in a common end loop 35 having the flared end 36. Secured to the bottom surface of the rod are the longitudinally spaced detent blocks 37, and slidably engaged on the rod is a ring member 38 secured to the rear portion of the loop 35, as shown at 39, whereby the ring member 38 may be adjusted longitudinally along the rod to cause the looped end 36 to engage between a selected pair of detent blocks 37. This adjusts the fulcrum point of the spring arm 24' longitudinally with respect to the loop 19, whereby a desired degree of clamping pressure may be provided for holding the float ball 15 against the lower portion of the loop 19.

An auxiliary ball-engaging loop member 40 is provided, the arms 41 of said loop member being secured to the side arms 27' of the main spring loop 24', as shown in Figure 5, whereby the float ball 15 may be more closely engaged and may be more positively held against the lower portion of the loop 19 when the ball is in the position shown in Figure 5.

As in the previously described form of the invention, the ball 15 will be drawn through the loop 19 when the line 14 is reeled in. In making a cast, the centrifugal force, namely, the inertia of the ball 15 in combination with the movement of the ball through the air as the rod is swung, will cause the ball to disengage from the loop 19 and pass forwardly therethrough, providing the desired cast of the fishing line.

In the form of the invention shown in Figures 9, 10 and 11, a forwardly and upwardly inclined retaining loop 50 is secured at 51 to the top surface of the forward portion of the fishing rod 12, and the spring loop, shown at 52, is formed with knee bends 53 extending over the transversely extending bight portion 54 of the retaining loop 50. The respective side arms of the spring loop 52 are formed beyond the bends 53 with the depending loop elements 55 which terminate in arm portions 56 passing beneath the bight 54 of loop 50, as shown in Figure 10. The ends of the arm portions 56 are rigidly connected at 57 to the bowed spring arm portions 25', whereby the spring arm is pivotally connected to the transverse 54.

Designated at 58 is a washer which is slidably mounted on the fishing rod and which is engaged by the end of a coiled spring 59 surrounding the rod forwardly of the washer 58, as shown in Figure 10. Threaded on the end of the rod is a nut 60 which bears against the end of the spring 59, the tension of the spring being adjustable by adjusting the nut 60 on the threaded end of the rod. Thus, the adjustment of the nut 60 provides an adjusted bearing force on the depending loop elements 55 thereby adjusting the normal tension of the spring arm 52, whereby the float ball 15 may be held against the lower portion of the loop 19 with a desired amount of clamping force. As in the previously described form of the invention, when a cast is made, the inertia of the ball causes the ball to disengage from and pass forwardly through the loop 19. To reset the fishing rod for the next cast, the line is merely reeled in, whereby the ball is drawn through the loop 19 and is clampingly locked against the lower portion of the loop by the spring arm 52.

While certain specific embodiments of an improved casting pole has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a fishing pole, a fishing line slidably engaged with said pole, a ball member secured to the end of said line, a fishhook, means connecting said hook to said ball member, a loop member secured to the end of said pole and arranged to allow said ball member to pass therethrough when the line is retracted, and a spring arm connected to said pole adjacent the end thereof and arranged to yieldably clamp said ball member against a portion of said loop member when said ball member has been passed through the loop member by the retraction of said fishing line, said spring arm being yieldable to release said ball member when a cast is made with said pole.

2. In combination, a fishing pole, a fishing line slidably engaged with said pole, a ball member secured to the end of said line, a fishhook, means connecting said hook to said ball member, a loop member secured to the end of said pole and arranged to allow said ball member to pass therethrough when the line is retracted, a spring arm connected to said pole adjacent the end thereof and arranged to yieldably clamp said ball member against a portion of said loop member when said ball member has been passed through the loop member by the retraction of said fishing line, said spring arm being yieldable to release said ball member when a cast is made with said pole, and means on the end of the pole engaging a portion of said spring arm and being arranged to adjust the tension of said spring arm.

3. In combination, a fishing pole, a fishing line slidably engaged with said pole, a ball member secured to the end of said line, a fishhook, means connecting said hook to said ball member, a loop member rigidly secured to the end of said pole and extending substantially perpendicularly to said pole, said loop member being arranged to allow said ball member to pass therethrough when the line is retracted, a generally U-shaped spring arm connected to said pole adjacent the end thereof and arranged to yieldably clamp said ball member against a portion of said loop member when said ball member has been passed through the loop member by the retraction of said fishing line, said spring arm being yieldable to release said ball member when a cast is made with said pole, and means on the end of the pole engaging a portion of said spring arm and being arranged to adjust the tension of said spring arm, said last-named means comprising a fulcrum element movably mounted on said pole and engaged with said spring arm, and means for locking said fulcrum element at a selected position along the pole to adjust the normal spring tension of said spring arm.

References Cited in the file of this patent

UNITED STATES PATENTS

| 491,558 | Hill | Feb. 14, 1893 |
| 958,775 | Shakespeare | May 24, 1910 |
| 2,158,396 | Birnstock | May 16, 1939 |
| 2,180,781 | Taylor | Nov. 21, 1939 |